(12) United States Patent
Galvin et al.

(10) Patent No.: US 11,546,319 B2
(45) Date of Patent: Jan. 3, 2023

(54) DOMAIN NAME MANAGEMENT WITH NETWORK ENTITY AUTHENTICATION USING SELF-SIGNED CERTIFICATES

(71) Applicants: James Galvin, Horsham, PA (US); Ashish Luthra, Toronto (CA); Michael Runcieman, Toronto (CA)

(72) Inventors: James Galvin, Horsham, PA (US); Ashish Luthra, Toronto (CA); Michael Runcieman, Toronto (CA)

(73) Assignee: AFILIAS LIMITED, Dublin (IE)

( * ) Notice: Subject to any disclaimer, the term of this patent is extended or adjusted under 35 U.S.C. 154(b) by 184 days.

(21) Appl. No.: 17/139,450

(22) Filed: Dec. 31, 2020

(65) Prior Publication Data

US 2022/0210147 A1 Jun. 30, 2022

(51) Int. Cl.
*H04L 29/06* (2006.01)
*H04L 9/40* (2022.01)
*H04L 61/4511* (2022.01)

(52) U.S. Cl.
CPC ...... *H04L 63/0823* (2013.01); *H04L 61/4511* (2022.05); *H04L 63/166* (2013.01); *H04L 63/18* (2013.01); *H04L 2463/081* (2013.01)

(58) Field of Classification Search
None
See application file for complete search history.

(56) References Cited

U.S. PATENT DOCUMENTS

| 2013/0262860 A1* | 10/2013 | Lamb | H04L 9/321 |
| | | | 713/156 |
| 2017/0279617 A1* | 9/2017 | Blinn | H04L 63/06 |
| 2020/0127965 A1* | 4/2020 | Oron | G06F 16/1805 |

* cited by examiner

*Primary Examiner* — William J. Goodchild
(74) *Attorney, Agent, or Firm* — Haynes and Boone, LLP (57) ABSTRACT

A method for using a self-signed digital certificate for establishing a secure connection between an Extensible Provisioning Protocol (EPP) client and a server on a communications network, including: receiving a communicated self-signed certificate from the EPP client; obtaining a unique identifier of the EPP client, the unique identifier associated with a domain name stored in a Domain Name System (DNS); using the unique identifier to access a designated DNS record in a DNS zone of the DNS associated with the domain name; retrieving the copy of the digital certificate from the designated DNS record, the copy of the digital certificate containing a public key of the EPP client bound to the domain name; authenticating the copy of the digital certificate with the communicated self-signed certificate; and receiving a generated session key from the EPP client to establish the secure connection over the communications network with the EPP client.

27 Claims, 5 Drawing Sheets

DOMAIN NAME MANAGEMENT WITH NETWORK ENTITY AUTHENTICATION USING SELF-SIGNED CERTIFICATES

FIELD

The present invention is related to management of domain names.

BACKGROUND

Domain names are used in various networking contexts and application-specific naming and addressing purposes. In general, a domain name represents an Internet Protocol (IP) resource, such as a personal computer used to access the Internet, a server computer hosting a web site, or the web site itself or any other service communicated via the Internet. In 2014, the number of active domains reached 271 million. Today's Internet presence by companies is considered a critical element of their business.

In order to establish a secure connection between VPN gateways, an authentication method must be employed to validate the identity of the participants. Proper device authentication prevents unauthorized access to the VPN network and provides origin authentication. Two common means of authenticating VPN tunnels are pre-shared keys and digital certificates. Both are considered strong authentication methods. When dealing with large VPN networks, managing large numbers of pre-shared keys can become cumbersome. Digital certificates are a much more scalable authentication solution. Digital certificates are not bound to an IP address, but instead can use unique, static identification information that can be validated by the Certificate Authority. This allows remote users with a dynamically assigned IP address to authenticate using identification information contained in the certificate, and the keying material is formed independent of information in the certificate.

The role of the Certificate Authority (CA) helps re-enforce the trust relationship between peers participating in the VPN, however there are disadvantages with use of CA generated certificates. In cryptography and computer security, a self-signed certificate is a security certificate that is not signed by a certificate authority (CA). These certificates are easy to make and do not cost money. However, they do not provide all of the security properties that certificates signed by a CA aim to provide, including man-in-the-middle (MitM) attacks, which allows a third party to read and modify all data sent between a client and server.

Further, the public CA model upon which TLS can depend is considered fundamentally vulnerable. The DNS-Based Authentication of Named Entities (DANE) Transport Layer Security (TLS) Protocol: TLSA (ISSN: 2070-1721—August 2012), described in RFC 6698, discusses a clear disadvantage with the use of CA issued certificates, being that the public CA model for TLS is fundamentally vulnerable because it allows any of these multiple CAs (involved in the CA implemented chain of trust model) to issue a certificate for any domain name. Any one of the multiple trusted CA that betrays its trust, either voluntarily or by providing less-than-vigorous protection for its secrets and capabilities, can undermine the security offered by any certificates employed with TLS. This security problem arises because a compromised CA can issue a replacement certificate that contains a fake key. Recent experiences with compromises of CAs or their trusted partners have led to very serious security problems.

Further, RFC 6698 discusses that DANE offers an option to use the DNSSEC infrastructure to store and sign keys and certificates that are used by TLS. It is considered that the resulting system (combining DANE with CA issued certificates) still has residual security vulnerabilities, however the resulting system can restrict the scope of assertions that can be made by any entity, consistent with the naming scope imposed by the DNS hierarchy. As a result, DANE can embody a security "principle of least privilege" that is lacking in the current public CA model. In general RFC 6698 discusses the ability for a DNS administrator to make an authoritative binding between the domain name and a certificate that might be used by a host at that domain name, i.e. using the DNS in order to secure this authoritative binding with DNSSEC.

The protocol discussed in RFC 6698 is referred to as the "DANE TLSA" protocol, such that "TLSA" represents the name of the RRtype used to store the certificate. However, a clear disadvantage with the DANE TLSA protocol is that RFC 6698 only relates to getting the DNS information for the certificate association securely using DNSSEC, however authentication of the CA issued certificate resident in the DNS (i.e. in the TLSA record) must be performed using the CA backed PKIX authentication method (PKIX is an IETF (Internet Engineering Task Force) working group with the goal of supporting public key infrastructures based on X.509 on the Internet). It is clear that disadvantageously, the PKIX described certificate authentication method involves the use of the trusted CA's to authenticate the DNS retrieved certificate. CAs frequently reissue certificates with different validity periods, signature algorithms (such as a different hash algorithm in the signature algorithm), CA key pairs (such as for a cross-certificate), or PKIX extensions where the public key and subject remain the same. These reissued certificates are the certificates that the TLS client can use in place of an original certificate.

For example, Appendix C of RFC 6698 describes the target certificate MUST pass a PKIX certification path validation. A TLS client would have multiple trust anchors that it might use when validating the TLS server's end entity (EE) certificate. Also, there can be multiple PKIX certification paths for the CA certificates given by the server in TLS. Thus, there are possibly many chains that might need to be tested during PKIX path validation, which involve the use of multiple CA's in certificate authentication. For example, Appendix C mentions that when the certificate passes a PKIX certificate validation, then the certificate is considered accepted. Accordingly, the PKIX validation method of DANE TLSA protocol (described in RFC 6698) is considered a disadvantage due to potential security risks when involving multiple CA's for the issue and subsequent authentication of CA certificates.

In the case of management of domains, secure connections between EPP server and EPP client are required, in order to safeguard requested changes/updates to objects of domains stored in a domain name registry database.

SUMMARY

The present disclosure advantageously provides various inventive embodiments including to provide a system and method for domain names to obviate or mitigate at least some of the above presented disadvantages.

For example, it is considered that DNS is more trustworthy than multiple CAs when considering issuance and authentication of self-signed certificates. Further, self-signed certificates are considered more controllable (the registrar can issue their own self-signed certificates on their own timeline as well as have a say in how they are stored in the DNS). The server that the client of the registrar communicates with (e.g. for EPP communications) is depending upon the client for trusting the contents of the self-signed certificate, so weakness of the current CA issued certificate system is that multiple CAs must be relied upon (for the CA based chain of trust) rather than using client and DNS for management of the self-signed certificate directly.

A first aspect provided is a method for using a digital certificate for establishing a secure connection between an Extensible Provisioning Protocol (EPP) client and a server on a communications network, the digital certificate being a self-signed certificate, the method including the steps of: receiving a communicated self-signed certificate from the EPP client; obtaining a unique identifier of the EPP client, the unique identifier associated with a domain name stored in a Domain Name System (DNS); using the unique identifier to access a designated DNS record in a DNS zone of the DNS associated with the domain name; retrieving the copy of the digital certificate from the designated DNS record, the copy of the digital certificate containing a public key of the EPP client bound to the domain name; authenticating at least a portion of the copy of the digital certificate with a corresponding portion of the communicated self-signed certificate by comparison; and receiving a generated session key from the EPP client to establish the secure connection over the communications network with the EPP client.

A second aspect provided is a method for utilizing a digital certificate in establishing a secure connection between an Extensible Provisioning Protocol (EPP) client and a server on a communications network, the digital certificate being a self-signed certificate, the method including the steps of: generating the self-signed certificate for use by the EPP client; obtaining a unique identifier associated with the EPP client, the unique identifier associated with a domain name stored in a Domain Name System (DNS); selecting a designated DNS record in a DNS zone of the DNS associated with unique identifier; requesting storage of a copy of the self-signed certificate in the designated DNS record, the copy of the self-signed certificate containing a public key of the EPP client bound to the domain name; sending the self-signed certificate to the server for use in authentication by the server of the self-signed certificate by comparison of at least a portion of the copy of the self-signed certificate with a corresponding portion of the self-signed certificate; and upon authentication of the self-signed certificate, negotiating a generated session key between the EPP client and the server to establish the secure connection over the communications network; wherein an issuer of the self-signed certificate operates the EPP client.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Figure 1:
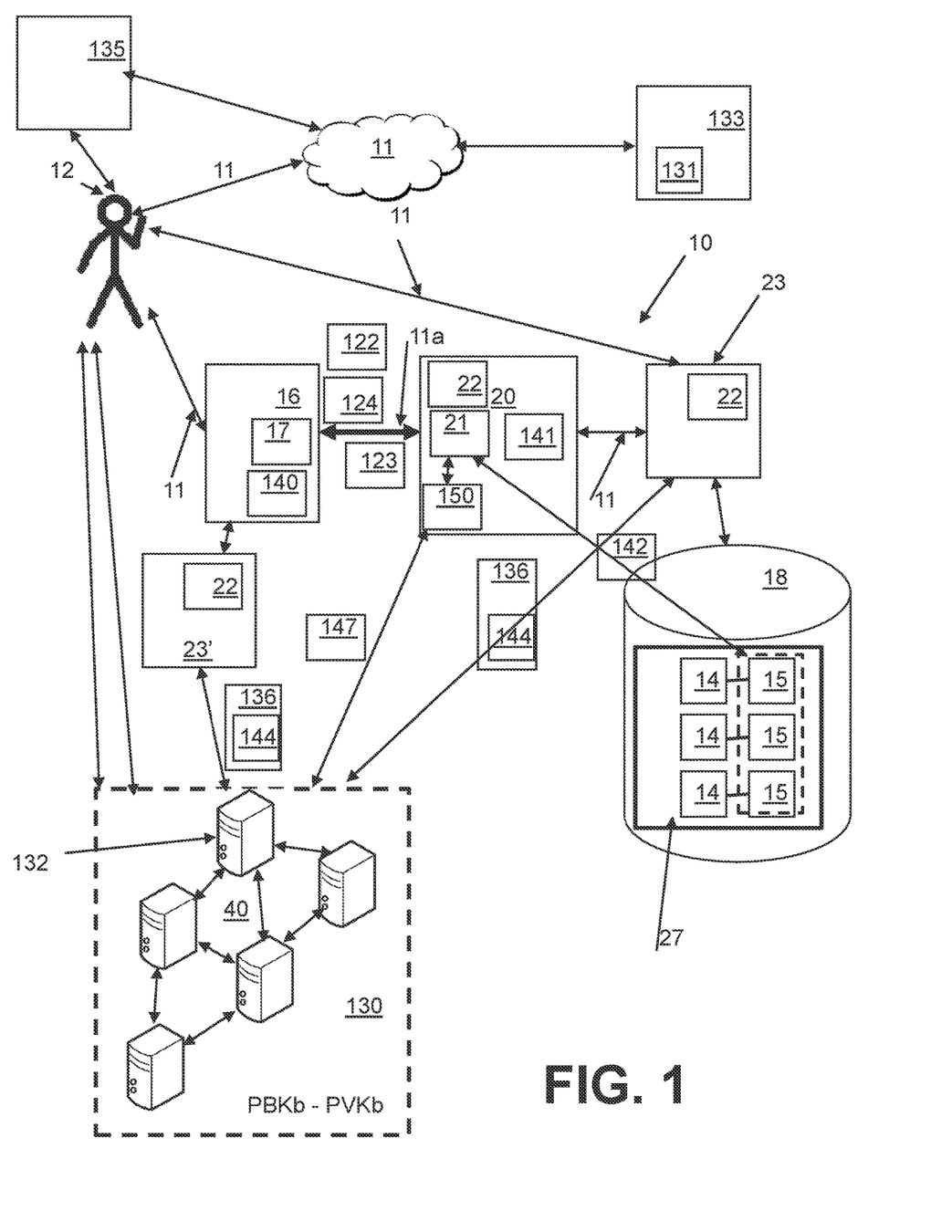
FIG. 1 is a block diagram of components of a domain name management system.

Referring to FIG. 1, shown is a domain name management system 10 providing for a domain name registrant 12 (e.g. domain owner) to manage over a communications network 11 (i.e. the Internet) their domain names 14, such that changes (e.g. updates, modifications, etc.) to the domain names 14 can be implemented via a domain name registrar 16 for multiple domain names 14 in a domain name registry database 18 (e.g. a database of all domain names registered in a Top-Level Domain (TLD)). It is recognized that the domain name registry database 18 can be managed by a registry operator 20 that can also coordinate the generation by a DNS publication system 22 of zone files (e.g. DNS data 136), which are used by servers 132,135 in a Domain Name System (DNS) 130 to convert domain names to IP addresses.

As further described below, a secure connection 11a (e.g. an encrypted tunnel 11a) can be set up between the registrar 16 and the registry operator 20, such that the secure connection 11a can be used to implement secure communications (e.g. containing event requests 122 and event responses 124) for the purpose of executing domain name transactions 142 (e.g. EPP transactions 142) on domain name objects 15 stored in the domain name registry database 18 (for those domain names 14 managed by the registrar 16). Advantageously, the secure connection 11a is established prior to sending of the event requests/responses 122, 124, through the use of a self-signed certificate 140 provided by the registrar 16 to the registry operator 20, as part of the setup of the secure connection 11a (utilizing connection communication(s) 123). The self-signed certificate 140 is initially stored in a designated DNS record 144 (see FIG. 2) in the DNS 130 by a DNS provider 23' of the registrar 16 (e.g. using the DNS publication system 22—see FIG. 1), as a stored self-signed certificate 140', such that the subsequent set-up of the secure connection 11a can utilize access of the stored self-signed certificate 140' stored in the designated DNS record 144 for authentication purposes of the received self-signed certificate 140. For example, using the DNS provider 23', the registrar 16 can manage their own DNS zone file. For example, the registry service provider 23 can be an example of the DNS provider 23'.

Accordingly, the use of the designated DNS record 144, combined with a subject name 146 of the certificate 140 (see FIG. 3) being a unique identifier associated with the domain name 14' of the registrar 16 (e.g. the client 17 as an EPP client), the described system 10 provides a secure method to associate the certificate 140 that is obtained from the client 17 with a corresponding domain name 14' using DNS 130, such that the DNS information 136 is protected by DNSSEC (for example using DANE as further discussed below). Because the certificate 140 association was retrieved based on a DNS query 147 for the designated DNS record 144, the domain name 14' in the query is by definition associated with the certificate 140. In terms of authentication of the certificate 140, this can be facilitated using the retrieved certificate 140' that can have a unique identity (associated with the domain name 14') as the subject name 146 of the certificate 140'. It is recognized that the designated DNS record 144 can be found in the DNS 130 in a DNS zone associated with the domain name 14' of the registrar 16 (e.g. responsible for operation of the client 17).

In view of the above, it is recognized that the DNS data 136 includes data used by network users to convert domain names to IP addresses in order to facilitate their navigation of the Internet, as well as includes the stored self-signed certificate 140' resident in the designated DNS record 144. The DNS data 136 (in the DNS 130) pertaining to the domain name of the registrar 16 would contain the designated DNS record 144 (and stored self-signed certificate 140'). The DNS data 136 (in the DNS 130) pertaining the domain name(s) 14 of the registrants 12 (i.e. customers of the registrar 16) would contain data used by the servers 132, 135 to convert domain names (e.g. example.info) to IP addresses to facilitate navigation of network resources 131, as further described below.

Figure 2:
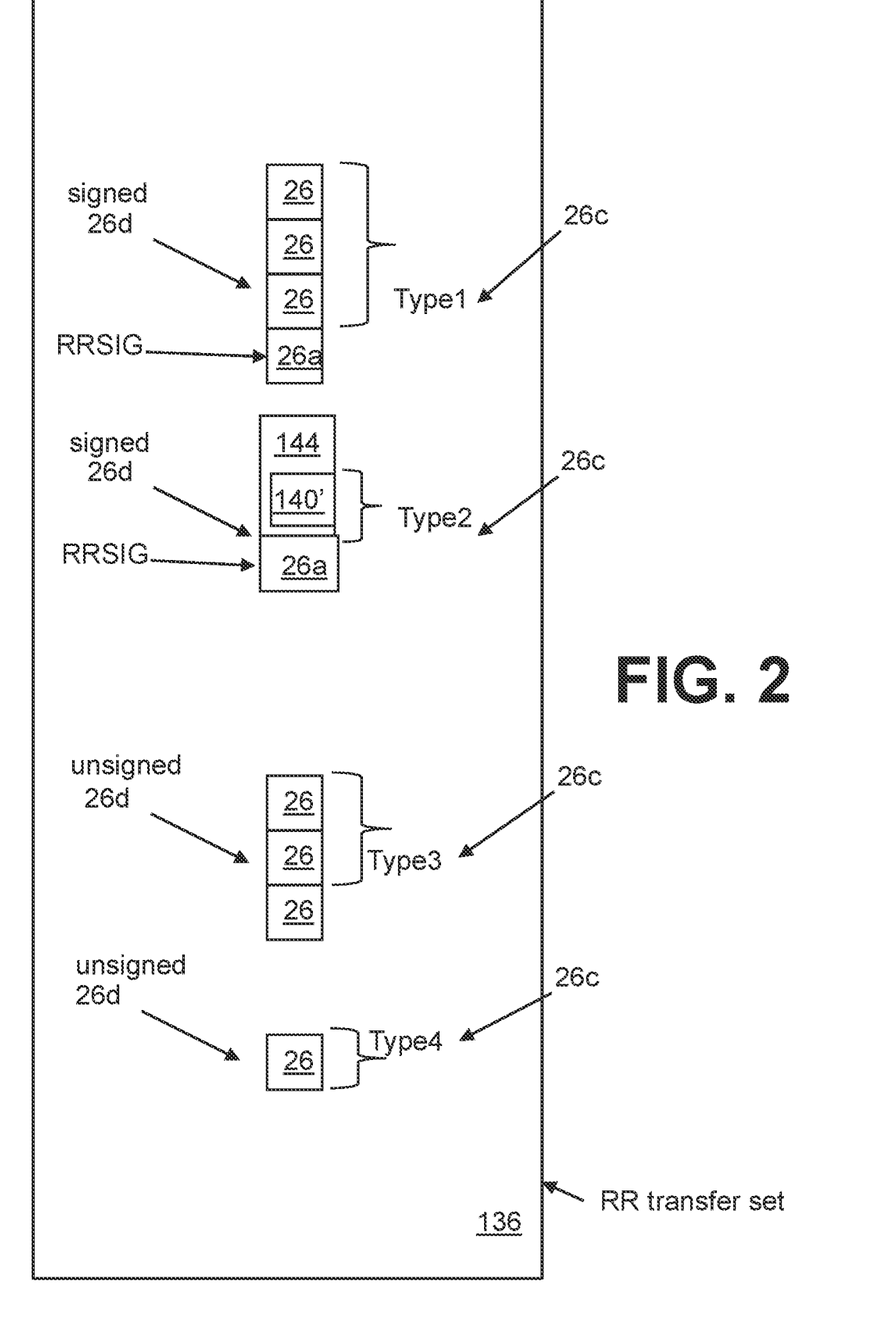
FIG. 2 is a block diagram of an example resource record transfer set for a DNS associated with the system of FIG. 1.
Figure 3:
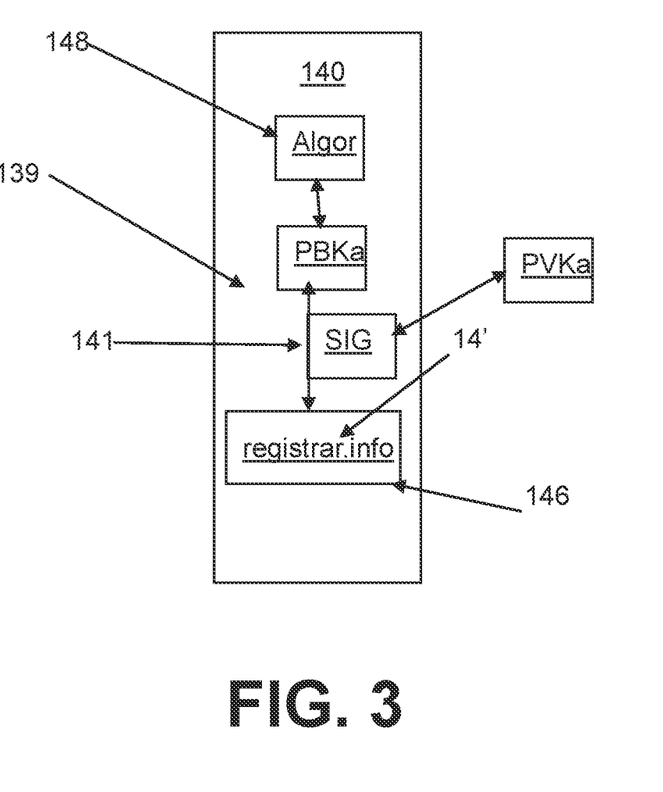
FIG. 3 shows an example certificate of the system of FIG. 1.

Referring to FIGS. 2, 3, the type 26c of DNS record (for the designated DNS record 144) is known (e.g. predefined) to the server 21, for use in locating the stored self-signed certificate 140' when trying to authenticate the received self-signed certificate 140 from the registrar 16 (e.g. client 17), when in the process of negotiating the setup of the secure connection 11a via the connection communication(s) 123. As further described below, example types 26c of the designated DNS record 144 can be: a DNS-based Authentication of Named Entities (DANE) enabled Transport Layer Security Authentication (TLSA) record 144; a CERT resource record (RR) 144 used for storage of certificates in the DNS 130; or both, as desired. As such, it is recognized that a copy of the self-signed certificate stored in the DNS 130 is referenced by 140', while the self-signed certificate present in the connection communication(s) 123 is referenced as 140.

The designated DNS record 144 contains a RRSIG record 26a as enabled in the DNS 130 using DNS KEYS (e.g. DNS public PBKb—private PVKb pair). One example designated DNS record 144 is the TLSA record 144, which has contents of the self-signed certificate 140' itself (e.g. a copy of the self-signed certificate 140 shown in FIG. 3), a port number (e.g. the port number that the server listens on), the protocol used (e.g. UDP, TCP, SCTP), the associated RRSIG 26a for DNSSEC purposes as part of DANE for providing a signed resource record 26d, as well as the specific hostname (e.g. the domain name 14' of the client 17 which can also be a subject name 146 of the self-signed certificate 140, for example registrar.info—see FIG. 3). A further example of the designated DNS record 144 is a CERT resource record (RR) 144, which has contents of a type field of the certificate (e.g. X.509 as per PKIX—see RFC 6698 as an example), a key tag as a 16 bit value computed for the public key PBKa embedded in the self-signed certificate 140', an algorithm field being the same as the algorithm field in an DNSKEY and RRSIG resource records, and a certificate section for containing the certificate 140' itself. The CERT resource record (RR) 144 contains an RRSIG 26a in the case that the CERT resource record (RR) 144 is considered a signed resource record 26d, recognizing that DNS data 34 for which the server 132 is authoritative would includes only signed records 26 for a signed/secure DNS zone.

It is recognized that the designated DNS record 144 is located in a zone of the DNS 130 for the domain name 14' associated with the client 17 (of the registrar 16). Once authenticated, then the client 17 will be able to use the established secure connection 11a to communicate the event requests/responses 122,124 (e.g. an EPP command affecting a domain object 15 as a domain name transaction 142 associated with the domain name(s) 14 managed by the registrar 16, on behalf of the user(s) 12 as registrants of the domain name(s) 14).

In other words, the DNS data 136 of a respective domain name 14 is representative of a text file that describes a portion of the DNS 130 called a DNS zone for the domain name 14, including the owner of the record. Further, the DNS data 136 of a respective domain name 14' of the registrar 16 is representative of a text file that describes a portion of the DNS 130 called a DNS zone for the domain name 14', including the registrar 16 as owner of the record. As such, the domain name 14' (e.g. as the subject name 146 of the self-signed certificate 140—see FIG. 3) and a public key PBKa of the self-signed certificate 140 are associated with one another (e.g. bound 141) in the self-signed certificate 140 itself. The process of binding 141 is via the presence of a signature SIG in the self-signed certificate 140 (utilizing the private key PVKa of the public PBKa—private PVKa key pair of the registrar 16), such that the self-signed certificate 140 contains a number of elements 139. As such, the private key PVKa of the registrar 16 (e.g. associated with the client 17) is used to sign the certificate 140,140'.

In view of the above, as further described below, the server 21 utilizes contents of the connection communication(s) 123 (i.e. at least the domain name 14' of the client 17 including the self-signed certificate 140 itself) in order to navigate the DNS 130 by generating a DNS query 147 to the server(s) 132, 135 of the DNS 130 in order to access the designated DNS record 144 (in the DNS 130) present in the DNS zone of the domain name 14' (e.g. also provided as the subject name 146 of the stored self-signed certificate 140', or otherwise associated with the domain name 14' of the registrar 16). In other words, the server 21 will generate the DNS query 147 for the designated DNS record 144 (stored in the DNS zone for the domain name 14'). In terms of accessing the appropriate authoritative server 132 responsible for the DNS zone of the domain name 14', the server 21 could implement an authoritative DNS lookup using the domain name 14' associated with the client 17. Upon retrieving the stored self-signed certificate 140' from the designated DNS record 144, validation and authentication of the self-signed certificates 140', 140 is performed, as further described below. In particular, it is emphasized that a comparison of the stored self-signed certificate 140' with the received self-signed certificate 140 (or at least a portion of the contents 139 such as the public key PBKa) must result in a match, thereby authenticating the received self-signed certificate 140, in order for the session key of the secure connection 11a to be generated on the communications network 11 between the client 17 and the server 21.

Accordingly, the use of the designated DNS record 144 to contain the stored self-signed certificate 140' has the advantage of providing a level of trust (e.g. trust anchor) in that the self-signed certificate 140 provided by the client 17 is valid and authentic (when the certificates 140, 140' match). As discussed, an authenticated self-signed certificate 140 means that the server 21 can trust the public key PBKa of the self-signed certificate 140 and therefore have confidence that the client 17 is to be trusted (they are who they say they are) when setting up the secure connection 11a. In other words, in the event that the self-signed certificate 140 is authenticated, the server 21 can be assured that the client 17 (of the registrar 16) has the requisite authority to implement the desired domain transactions 142 on the object(s) 15 of the domain name(s) 14 (managed by the registrar 16 on behalf of the registrant(s) 12), when using the secure connection 11a of the communication network 11.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that the domain name registrar 16, the registry operator 20 and an optional registry services provider 23,23' (e.g. providing an example DNS publication system 22) can be implemented on computer devices 100 (see FIG. 5) such as servers and can communicate with one another via the network 11 in client-server relationships. It is recognised that the DNS publication system 22 can be implemented as a stand-alone system provided as a network service to the registry 20 (e.g. via the registry services provider 23 and/or DNS provider 23'). Alternatively, it is recognised that the DNS publication system 22 can be implemented as a system hosted on computer infrastructure of the registry 20.

The secure connection 11a can be generated using Transport Layer Security (TLS), for example, which can rely upon IP certificates (e.g. self-signed certificate 140) to generate the session key used in forming the secure connection 11a. For example, TLS can be used to secure online communications 147. Normally TLS is implemented over protocols like the Transmission Control Protocol (TCP), but it can also be used in the Datagram Congestion Control Protocol (DCCP) and User Datagram Protocol (UDP). TLS can be used to build the secure connection 11a (e.g. VPNs, such as in OpenConnect and OpenVPN). TLS uses its encryption (e.g. keys PBKa, PVKa) and authentication (e.g. of the self-signed certificate 140) capabilities to form a tunnel (e.g. secure connection 11a) that can connect hosts (e.g. server 21 and client 17) and networks to each other. TLS-based VPN technologies are advantageous over alternatives like IPsec. Hence once generated, the secure connection 11a (e.g. TLS tunnel) encrypts all data (e.g. communications 147) sent over the TCP connection.

Also, it is recognised that the registry services provider 23 can be used to implement/execute the domain name transactions 142 against the objects 15 (in the database 18), on behalf of the registry 20. In this case, the registry 20 can provide any event requests 122 (received from the registrar 16) to the registry services provider 23, for subsequent implementation of the contained domain name transactions 142 against the objects 15 of the domain name(s) 14. In turn, the event response 124 would contain the results of the event request 122 (e.g. if/how the associated transaction 142 was processed). Alternatively, the registry services provider 23 (utilizing the server 21) can be configured to set up the secure connection 11a directly with the registrar 16, as desired. In any event, it is recognized that the secure connection 11a can be set up (as described herein) between the registry 20 and the registrar 16, or between the registrar 16 and the registry services provider 23, as desired. As such, the server 21 (as an EPP server) can be implemented by the registry 20 or by the registry services provider 23.

Domain Names 14, 14' (Hereafter Referred to Generically as Domain Name 14)

A domain name 14 can be referred to as an identification string which is organized in subordinate levels (subdomains) of a DNS root domain, which is nameless. Each domain name 14 consists of one or more parts, technically called labels, which are conventionally concatenated, and delimited by dots, such as label3.label2.label1. The first-level set (e.g. label1) of domain names 14 are the top-level domains (TLDs), including the generic top-level domains (gTLDs), such as the prominent domains info, mobi, and org, and the country code top-level domains (ccTLDs). Below these top-level domains in the DNS hierarchy are the second-level (e.g. label2) and third-level (e.g. label3) domain names 14 that are typically open for reservation by end-users who wish to connect local area networks to the Internet 11, create other publicly accessible Internet resources, or run web sites. The registration of these domain names 14 can be administered by the domain name registrars 16, who sell their services to the public. The hierarchy of domains descends from the right to the left label in the domain name 14; each label to the left specifying a subdivision, or subdomain of the domain to the right. As such, the terminology of domain and domain name can be used interchangeably. For example, domain name 14 can refer to all names contained in a Top Level Domain (TLD) 14.

For example, the top-level domains (TLDs) such as .info are the highest level of domain names of the Internet 11, whereby top-level domains form the DNS root zone of the hierarchical Domain Name System (DNS) 130, such that every domain name 14 ends with a top-level domain label. Each of the domain names 14 has a series of parent-child pairings for the labels, e.g. for the example domain name 14 label3.label2.label1—label3 is the child of label2 as the parent, label2 is the child of label1 as the parent, whereby one of the labels in the pairing is allowed to vary while the other of the labels in the pairing remains constant. In other words, domain names 14 could be such as but not limited to: a set of Top Level Domains (TLDs) of the same second level domain (e.g. label2.a, label2.b, label2.c such that "a", "b", "c" are different versions of label1); a set of second level domains (SLDs) of the same third level domain (e.g. label3.a.label1, label3.b.label1, label3.c.label1 such that "a", "b", "c" are different versions of label2); a set of Top Level Domains (TLDs) of different second level domains (e.g. a.label1, b.label1, c.label1 such that "a", "b", "c" are different versions of label2); a set of second level domains (SLDs) of different third level domains; and/or lower level domains (e.g. a .label2.label1, b. label2.label1, c. label2.label1 such that "a", "b", "c" are different versions of label3).

The registration of these domain names 14 is administered by domain name registrars 16 who sell their services to the public (i.e. registrants 12). The TLD names 14 such as .info, .mobi are the highest level of domain names of the Internet 11. Top-level domains form a DNS root zone of the hierarchical DNS 130 implemented on the Internet 11. As an example, in the domain example.co.info, co is the second-level domain. Second-level domains commonly refer to an organization (e.g. registrant 12) that registered the domain name 14 with the domain name registrar 16. Some domain name registry operators 20 introduce the second-level hierarchy to the TLD that indicates a type of entity intended to register an SLD under it, for example, in the .info namespace a college or other academic institution could register under the .ac.info ccSLD, while companies could register under .co.info. Next are third-level domain names 14, which are written immediately to the left of the second-level domain, recognising that there can be fourth- and fifth-level domains, and so on, with virtually no limitation.

Domain names 14 can be referred to as domains and domain name registrants 12 can be referred to as domain owners, although domain name registration with the registrar 16 may not confer any legal ownership of the domain name 14, only an exclusive right of use for a particular duration of time. As such, the domain name 14 can be considered an economic asset utilized as an identification string defining a realm of administrative autonomy, authority or control within the Internet 11. The domain names 14 are formed by the rules and procedures of the DNS 130, such that any name registered in the DNS 130 is a domain name 14. Domain names 14 can also be thought of as a location on the Internet 11 where certain information or activities can be found. A fully qualified domain name (FQDN) is a domain name 14 that is completely specified in the hierarchy of the DNS 130, having no parts omitted.

In terms of importance to functioning of the Internet 11 for searching for and accessing Internet 11 resources, domain names 14 serve as names for these Internet 11 resources such as computers, networks, and services. The domain name 14 represents an Internet Protocol (IP) resource and specifically, individual Internet host computers use domain names 14 as host identifiers, or host names (e.g. leaf labels in the DNS 130 usually without further subordinate domain name space). Of importance to Internet 11 navigation, host names appear as a component in Uniform Resource Locators (URLs) for Internet 11 resources such as web sites (e.g., Afilias.info). Domain names 14 can also be used as simple identification labels to indicate ownership or control of a resource. Such examples are the realm identifiers used in the Session Initiation Protocol (SIP), the Domain Keys used to verify DNS domains in e-mail systems, and in many other Uniform Resource Identifiers (URIs). An important function of domain names 14 is to provide easily recognizable and memorizable names to numerically addressed Internet 11 resources. Usability of the domain names 14 as an abstraction provides any resource to be moved to different physical locations in the address topology of the network 11, globally or locally in an intranet. Such a move usually involves changing the IP address of the resource and the corresponding translation of this IP address to and from its domain name 14, as facilitated by the DNS 130.

DNS 130

Referring to FIGS. 1 and 2, shown is the DNS 130 and an associated publication system 22 for coordinating and publishing DNS records (e.g. DNS data 136 including one or more Resource Record sets—RR sets 26) in the DNS 130 containing DNS servers 132 (e.g. Authoritative servers for the respective domain name 14). In general, the DNS servers 132 provide DNS 130 services for network users of the network 11 (e.g. Internet) resources 131 (e.g. as provided by a plurality of distributed web servers 133, mail servers 133, etc., as coordinated through various domain names 14 of the network 11). It is recognized that network resources 131 can be provided by one or more registry operators 20 (e.g. via registry databases 18), including external links to mail servers and/or other websites based on web page return results. The distributed servers 133 can rely upon one or more resolver servers 135, by which the network user ultimately accesses network resources 131 via the DNS 130.

However, as further described, advantageously the DNS 130 can also be used by a registry server 21 (e.g. an EPP server 21) for validating/authenticating the self-signed certificate 140 received from a registrar client 17 (e.g. an EPP client 17 of the registrar 16) as part of connection communication(s) 123, in order to establish the secure connection 11a between the client 17 and the server 21.

Referring again to FIGS. 1 and 2, the DNS publication service 22 (e.g. of the DNS provider 23') is configured to facilitate the sending of signed DNS data 136 to the DNS 130, such that the DNS data 136 would contain signed DNS records 26 and optionally one or more unsigned DNS records 26.

The DNS data 136 are based on resource records 26 (e.g. Name Server name/address records, Delegation Signer records, etc.) associated with the registry data 27 (e.g. the set of objects 15 associated with the domain name 14) in the registry database 18. It is recognized that DNSSEC related resource records 26 may or may not be stored in the registry database 18, as these can be generated on the fly by the DNS publication system 22 using DNS data generation instructions 107 (see FIG. 5) associated with the domain names 14. It is also recognized that the DNS data 136 can include other data specific to the DNS zone itself (e.g. the zone apex).

For example, zone data, e.g. the DNS data 136 of a domain name 14,14' is representative of a text file that describes a portion of the DNS 130 called a DNS zone, including the owner of the record. A zone data (e.g. the DNS data 136) is organized in the form of resource records (RR) 26 and contains information that defines mappings between domain names 14 and IP addresses and other resources 31, as based upon registry data 27. For example, the DNS data 136 contains the DNS records 26 in wire transfer format, as implemented in the DNS 130. The format of zone data can be defined by a standard, with each line typically defining a single resource record 26. A line begins with a domain name, but if left blank, can default to the previously defined domain name. Following the domain name can be the time to live (TTL), the class (which is almost always "IN" for "internet" and rarely included), a type 26c of resource record (A, MX, SOA, etc.), followed by type-specific data such as the IPv4 address for A records. Comments can be included by using a semi-colon and lines can be continued by using parentheses. There are also directives that are marked with a keyword starting with a dollar sign.

Referring to FIGS. 1, 2, and 3, the DNSSEC process is utilized by the DNS servers 132 of the DNS 130 to utilize digitally signed DNS data 136 (e.g. digitally signed DNS records also referred to as one or more Resource Record sets (RR set) 26d) at the authoritative DNS server (of the DNS servers 132) with encryption technology (e.g. public-key cryptography utilizing a public PBK and a private key PVK). It is also recognized that some of the resource records 26 (as part of the RR set(s) 26d) can also be unsigned (i.e. do not include a respective RRSIG record 26b associated as part of the RR set 26a of a particular record type 26c). Some of the registry data 27 for the resource records 26, used as part of the DNS data 136, are obtained from the registry database 18 associated with the particular domain name 14 (e.g. website URL), e.g. obtained by the DNS publication service 22 from the registry data base 18 and/or provided to the DNS publication service 22 by the registry operator 20, for example. For example, any record(s) contained in the RR set 26d relating to DNSSEC (e.g. the RRSIG record 26a) is/are incorporated into the RR set 26d by a signing system of the DNS publication system 22, or may be obtained by the DNS publication service 22 from the registry database 18 in performance of generating the DNS data 136 for subsequent publication to the DNS servers 132 of the DNS 130. Other DNSSEC related resource records 26 of the DNS data 136 can include records such as but not limited to: DNS Public Key (DNSKEY); Delegation Signer (DS); Next Secure (NSEC/NSEC3); as well as DNS header flags of Checking Disabled (CD) and Authenticated Data (AD). Further, it is also recognized that the DNS data 136 also contains the designated DNS record 144 containing the stored self-signed certificate 140'.

In general, the DNS data 136 (aka DNS records or zone files referred to as a Resource Record transfer/transaction 136) are instructions that are published (e.g. transmitted or eventually transmitted to the DNS servers 132) by the DNS publication service 22 to the (authoritative) DNS servers 132. The DNS data 136 provides information about a domain name 14,14' including what IP address is associated with that domain name 14,14' and how to handle requests (e.g. DNS requests from the network users and from the server 21) associated with network resources 131 for that domain name 14,14'. For example, a DNS record 26 can be defined as a single entry of the DNS data 136 that gives zone instructions on how to handle any given DNS 130 related request based on record type 26c. In general, the DNS record 26 has at least three pieces of information, namely: a Record Name; Record Value/Data; and Time to Live (TTL). These DNS records 136 consist of a series of text files written in what is known as DNS syntax. DNS syntax can be a string of characters used as commands, which instruct the DNS server 132 what to do upon receiving a DNS lookup request 147 (e.g. from the network user 12), or in the case of establishing the secure connection 11a a DNS inspection request 147 of the designated DNS record 144, for example. All DNS records 136 can also have a 'TTL', which stands for time-to-live, and indicates how often a DNS server 132 would refresh that particular DNS record 136. Accordingly, all domains 14,14' are required to have at least a few essential DNS records 136 for the network user/server 21 to be able to access the network resources (e.g. website(s)) associated with the domain name 14, 14' amongst other additional DNS 130 implemented functionality such as the presence and use of the designated DNS record 144 as further described below.

The server 21 utilizes validations of the DNSSEC signatures RRSIGs 26a of the DNS records 26 (of the DNs data 136) using standard DNSSEC validation procedures, in cooperation with the server(s) 132, 135 of the DNS 130. Referring again to FIG. 2, for signed portions of the DNS data 136, i.e. those including the RRSIG 26a, when DNSSEC is used (i.e. the particular RR set 26d is digitally signed), each answer provided by the DNS server 132 (e.g. to a received DNS lookup of the network user or the inspection request 147 of the designated DNS record 144) would contain the RRSIG record 26a, in addition to other record types 26c that were requested. As such, the RRSIG record 26a represents a digital signature of the answer DNS resource record set, i.e. RR set 26d containing one or more resource records 26 of the same record type 26c. Further, the digital signature contained in the RRSIG record 26a can be verified by the server (e.g. resolver server 132 used in processing the DNS lookup/access to the network resource 131, or DNS server 132 used to access the designated DNs record 144) communicating with the DNS server 132 by locating the correct public key found in the DNSKEY record of the DNS data 136. It is further recognized that each RR set 26d can contain one or more resource records 26 of the same record type 26c. Further, each RR set 26d can be signed (and thus contain a respective RSIG record 26a), or can be unsigned (and thus not contain a respective RRSIG record 26a). It is also recognized that, as shown by example in FIG. 2, that each set of DNS data 136 (e.g. also referred to as a set of DNS records or RR transfer set or RR transaction set) can contain one or more RR set(s) 26d. Also, preferably, each set of DNS data 136 only contains one RR set 26d for a particular resource record type 26c (e.g. signed or unsigned). In particular, the designated DNS record 144 would be of a record set 26d that can have an RSIG record 26a used to assist in DNSSEC security in the access and subsequent inspection of the contents (i.e. self-signed certificate 140) of the designated DNS record 144.

In terms of DNSSEC validation procedures for the designated DNS record 144 as a TLSA record, this can be referred to as DNS-Based Authentication of Named Entities (DANE). As stated, the security of the DNS 130 for the RRtypes 26c described relies on the security of DNSSEC to verify that the designated DNS record 144 (e.g. TLSA record) has not been altered by anyone other that the registrar 16 (or an authorized agent thereof such as the service 23). DNSSEC forms certificates (the binding of an identity to a key) by combining a DNSKEY, DS, or DLV resource records 26 with an associated RRSIG record 26a. These records 26 then form a signing chain extending from the user's (e.g. server 21, client 17) trust anchors to the RR of interest (e.g. the designated DNs record 144). Although the DNSSEC protocol does not enforce it, DNSKEYs are can be marked with a SEP flag indicating whether the DNSKEY is a Zone Signing Key (ZSK) or a Key Signing Key (KSK). ZSKs protect records 26 in the zone of the respective domain name 14, 14' (including DS and DLV records as well as the designated DNS record 144), and KSKs protect ZSK DNSKEY records. This provides for KSKs to be stored offline, for example. The TLSA RRtype of the designated DNS record 144 can provide keys from the DNSSEC PKI hierarchy to authenticate keys wrapped in PKIX certificates for a particular host name, protocol, and port of where the designated DNS record 144 is stored in the DNS 130 (and thus can be retrieved therefrom using the understood DNSSEC protocols for navigation of the DNS 130).

Accordingly, an RRSIG-record 26a holds a DNSSEC signature for a record set 26d (one or more DNS records with the same name and type). Server(s) 132, 135 can verify the signature with a public key stored in a DNSKEY-record. In particular, RRSIG-records 26a can have the following data elements: Type 26c Covered, DNS record type that this signature covers; Algorithm, Cryptographic algorithm used to create the signature; Labels, Number of labels in the original RRSIG-record name (used to validate wildcards); Original TTL, TTL value of the covered record set 26d; Signature Expiration, When the signature expires; Signature Inception, When the signature was created; Key Tag, A short numeric value which can help quickly identify the DNSKEY-record which can be used to validate this signature; Signer's Name, Name of the DNSKEY-record which can be used to validate this signature; and Signature, Cryptographic signature.

In view of the above, it is recognized that utilization of the DNS data 136, via the DNS 130, can facilitate determination by a security-aware DNS server 132,135 (e.g. the one or more network server(s) assisting in navigating to the network 11 (e.g. IP) address the network user/server 21 wishes to access) if a) the answer (to a DNS lookup request) the resolver server 135 received was correct (i.e. secure), b) whether the DNS server 132 for the domain being queried doesn't support DNSSEC (insecure), or c) if there is some sort of error with the answer obtained from the DNS server 132. Further, it is recognized that that, in general, the DNS data 136 published to the DNS 130 is useful in facilitating that the correct DNSKEY record can be found via an Authentication Chain, starting with a known good public key PBKb (which can be the same or different to the PBKa) or a Trust Anchor, preferably at the DNS root. This public key can then be used by the respective servers 132, 135 (e.g. resolver server) to verify a delegation signer (DS) record associated with the respective domain name 14,14' of interest. For example, a DS record 26 in a parent domain (DNS zone) can then be used to verify a DNSKEY record in a subdomain, which can then contain other DS records to verify further subdomains as the DNS 130 is navigated by the various server(s) 132,135 in order to satisfy the DNS query (e.g. DNS query 147 for the designated DNS record 144).

Referring again to FIG. 2, DNSSEC was designed to deal with cache poisoning and a set of other DNS vulnerabilities such as man in the middle attacks and unauthorized data modification in authoritative servers. Its major objective is to provide origin authentication and integrity protection for the DNS data 136, advantageously for the designated DNS record 144 (and contained self-signed certificate 140' therein). The public key infrastructure (PKI) can be used as means of public key distribution for the signed RR set(s) 26d of the DNS data 136. DNSSEC provides a verification mechanism for the DNS data 136 and is not an encryption mechanism. It allows a security-aware resolver 135 (see FIG. 1) to verify that the zone data that has been received is signed by the administrator of the zone who holds the private key PVKb.

As discussed, a zone may have one or more key pairs (PBKb-PVKb), each of which includes a respective private key and public key. The private keys may be stored securely in the DNS publication service 22 (e.g. in a high security module of a signing system used by the publication system 22 in generating the signed DNS data 136) and used to sign zone data (e.g. the DNS data 136). The public keys may be stored in the DNS publication service 22 and also stored in the signed DNS data 136 as DNSKEY resource records. The public keys are used to verify zone data. DNSKEY records typically have the following data elements: Flags—"Zone Key" and "Secure Entry Point"; Protocol—fixed value of 3 (for backwards compatibility); Algorithm—the public key's cryptographic algorithm; and Public key—public key data. A DNSKEY Resource Record ("RR") may be either a Zone Signing Key (ZSK) or a Key Signing Key (KSK). The Key Signing Keys (KSKs) will have a SEP flag set so that they can be distinguished from the ZSKs in the DNSKEY RRset. The Key Signing Keys (KSKs) are used to sign other DINSKEY resource records and are used to build a chain of authority to the data that is validated. In this manner, the navigation of the server 21 to the designate DNS record 144 (using DANE for example) is facilitated.

The RRSIG resource record 26a (see FIG. 2) holds the DNSSEC signature of a resource record set RRset 26d (one or more DNS records 26 with the same name, class, and type). DNSSEC enabled resolvers 135 (see FIG. 1) can verify the signature with a public key stored in the DNS-KEY-record. The RRSIG records can have the following data elements: Type Covered—DNS record type that this signature covers; Algorithm—cryptographic algorithm used to create the signature; Labels—number of labels in the original RRSIG-record name (used to validate wildcards); Original TTL—TTL value of the covered record set; Signature Expiration—when the signature expires; Signature Inception—when the signature was created; Key Tag—a short numeric value which can help quickly identify the DNSKEY-record which can be used to validate this signature; Signer's Name—name of the DNSKEY-record which can be used to validate this signature; and Signature—cryptographic signature. Further, it is recognized that the DNSKEY RRs can be signed by both active KSKs and ZSKs. Other RR sets can be signed by only active ZSKs.

Self-Signed Certificate 140, 140'

A digital certificate certifies the ownership of a public key by the named subject of the certificate, and indicates certain expected usages of that key. This allows others (relying parties) to rely upon signatures or on assertions made by the private key that corresponds to the certified public key. In general, a digital certificate can be thought of as an electronic passport used to validate the identity of the owner. The owner presents the certificate during secure communication session initiation to provide proof of identity to remote parties. An end user can obtain a certificate by generating a certificate request and sending the request to a trusted Certificate Authority that processes the request, validates the identity of the end user, and issues a certificate to the end user.

The certificate itself is an electronic document created using public key cryptography containing identity and encryption information for the signer of the certificate as well as the owner of the certificate. For example, digital certificates are a core component of the X.509 standard. X509 defines authentication protocols using public-key certificates and digital signatures. Digital certificates are based on the concept of public/private key cryptography, an asymmetrical encryption method utilizing a public and a private key pair. Either key can perform encryption or decryption, but a message encrypted with a particular key cannot be decrypted by that same key. That message can only be decrypted by the other key in the key pair.

In particular, in terms of self-signed digital certificates 140, 140', these bind the identity of the public key PBKa to its owner (i.e. the registrar 16 and thus the domain name 14'—see FIG. 3). By doing so, advantageously using DNSSEC of the DNS 130 to locate the digital certificate 140' adds a level of security to communications 122,124 by providing remote party authentication and nonrepudiation.

In particular, digital certificates 140, 140' can be of different types for a variety of applications. For example, the digital certificates 140, 140' can be X509 Certificates, e.g. also referred to as end-entity certificates (e.g. Identity, Client or Self-Certificates).

Contents 139 of the self-signed certificate 140 can be specified by the X.509 standard for directory services. A typical certificate 140 can contain as contents 139: Version number; version of the certificate 140 format Serial number; unique number associated with the certificate 140 Signature algorithm 148; reference to the algorithm 148 used to sign the certificate 140 Issuer information (i.e. the server 17); subject name 146 (e.g. the domain name 14' or otherwise a unique identifier that is associated with the domain name 14', which is used by the server 21 in authenticating the certificate 140) that created and issued the certificate Validity Period (e.g. the certificate is invalid beyond this time envelope Subject Name 146); identity information about the holder of the certificate, in the LDAP format C=US, CN=MyCompany Public Key: the Public Key PBKa of the holder of the certificate Subject Alt Name; and a hash/signature SIG of the contents 139 of the certificate 140 encrypted with the Private key PVKa.

In view of the above, in general, referring to FIG. 3, self-signed certificates 140 have the number of components 139. In basic handling of the self-signed certificates 140, the two entities, Host server 17 (in cooperation with Host sever 21) desires to use certificates to authenticate a VPN (i.e. secure connection 11a). The server 21 can use a CA issued certificate or a self-signed certificate 140. The server 17 wishes to use the self-signed certificate 140 to realize the advantages as discussed herein. The CA certificate would contain identity information for the CA and the CA public key in the case of the CA issued certificate (e.g. for the server 21).

To obtain a self-signed certificate 140, server 17 generates a public/private PBKa-PVKa key pair. The server 17 facilitates validation of the server's identity by assembling the user's identification (e.g. the domain name 14' or an alias associated with the domain name 14' as the subject name 146 of the certificate 140) and public key information PBKa into the digital document of the certificate 140. The server 17 (e.g. the registrar 16) will then "sign" this document by hashing the certificate contents 139 with its signing algorithm, such that he hash is then encrypted using the server's 17 private key PVKa and is included as the signature SIG in the certificate 140. When server 17 wishes to authenticate a session (e.g. establish the secure connection 11a) with server 21, server 17 will send (via connection communication(s) 123) the self-signed certificate 140 to server 21, which can be used by the server 21 along with accessing the designated DNS record 144 to generate the secure connection 11a. In order to validate the self-signed certificate 140. The server 21 can then use the public key PBKa to decrypt the self-signed certificate 140 of server 17. Server 21 can now run the signing algorithm 148 (referenced in the certificate contents 139 for example) and re-create a hash of server 17's certificate 140. If the re-created hash of server 17's certificate 140 self-certificate matches the hash/signature SIG created by the server 17, the certificate 140 is deemed valid. Once validated, the self-signed certificate 140 can then be authenticated using the designated DNs record 144, as further described below.

Establishing the Secure Connection 11a

Figure 4:
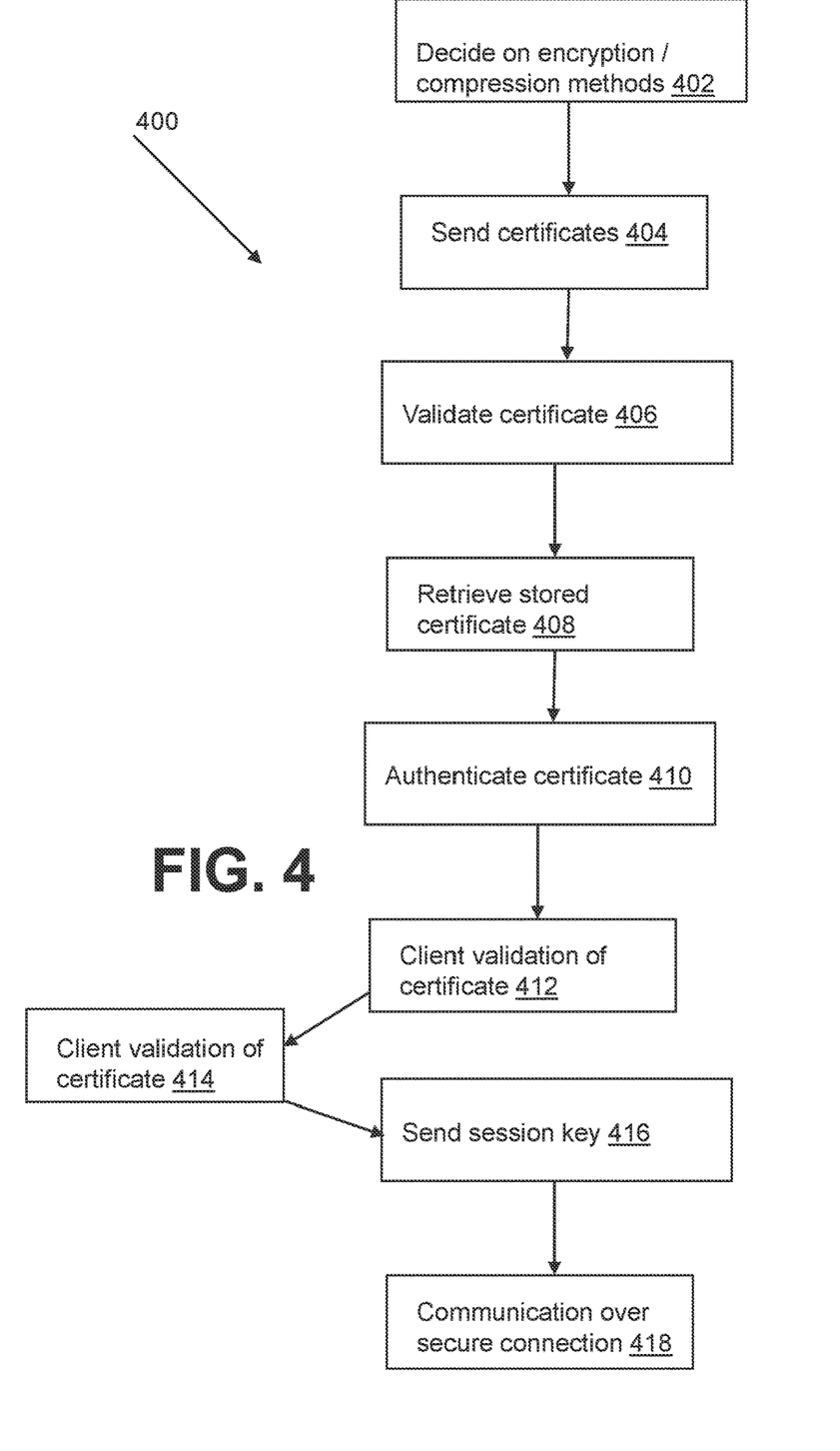
FIG. 4 shows an example operation of the system of FIG. 1.

Referring to FIGS. 1 and 4, the client 17 initiates 400a session with the server 21 by sending/receiving a series of connection communications 123, for example a hello message, certificate exchange messages, and session key exchange message. At step 402, the hello message contains information about the client 17 including preferences for encryption and compression methods. The server 21 can respond to the client 17 with similar information, such that if the server 21 and client 17 support mutually agreeable methods, the (e.g. SSL) session can be established. For example, the handshake begins when the client 17 connects to a TLS-enabled server 21 requesting a secure connection 11a and the client 17 presents a list of supported cipher suites (ciphers and hash functions). From this list, the server 21 picks a cipher and hash function that it also supports and notifies the client 17 of the decision.

Once the session is agreed upon (e.g. established), at step 404 the server 21 sends its site certificate 141 to the client 17 and the client 17 sends its self-signed certificate 140 to the server 21 for mutual authentication purposes.

At step 406, the server 21 validates the certificate 140 (e.g. see example validation process described above).

At step 408, once validated then the server 21 retrieves the certificate 140 by knowing the DNS zone associated with the domain name 14' (e.g. by obtaining the subject name 146 of the certificate 140) from the certificate components 139 and then sending an inspection DNS query 147 to the server(s) 132 of the DNS 130 (associated with the DNS zone assigned to the domain name 14'), in order to navigate the DNS 130 to obtain contents (i.e. stored self-signed certificate 140') of the designated DNS record 144. As discussed, the unique identifier of the registrar 16 (and thus of the client 17) can be stored in the subject name 146 of the self-signed certificate 140. The unique identifier can be the domain name 14' itself, for example. Alternatively, the unique identifier can be an alias of the domain name 14', such that the server 21 could consult a list 150 of aliases in order to match the unique identifier (e.g. the subject name 146 of the certificate 140) to the domain name 14' of the client 17. Once matched, then the domain name 14' could be used in the inspection query 147 to locate the designated DNS record 144 in the DNS 130. It is recognised that the server 21 would direct the inspection query 147 to the authoritative server(s) 132 (e.g. as determined by a DNS lookup using the domain name 14') of the domain name 14', in order to navigate the DNS 130 (using DNSSEC) to retrieve the self-signed certificate 140' from the designated DNS record 144 as a response to the inspection query 147.

It should be recognised that the domain name 14' and the designated DNS record 144 associated therewith can be treated as a priori knowledge (for the server 21) concerning the generation of the secure connection 11a. In other words, the registrar 16, in advance of participating in the connection communications 123 between the server 21 and the client 17, would have the copy of the self-signed certificate 140' generated and then stored in the designated DNS record 144. Further, it is recognised that the domain name 14' of the registrar 16 (i.e. associated with the client 17) is also considered a priori knowledge (for the server 21), as the domain name 14' would be in existence (e.g. as present in the DNS 130 and list 150) before the secure connection 11a is generated.

At step 410, the server 21 then authenticates the received self-signed certificate 140 by doing a comparison of at least a portion of the contents 139 of the retrieved self-signed certificate 140' with at least a portion of the contents 139 of the received self-signed certificate 140 (e.g. a byte by byte comparison of the contents 39 portion of each certificate 140'140' with one another). If the comparison determines that the received self-signed certificate 140 matches retrieved self-signed certificate 140', then the server 21 can trust the identity of the client 17. In other words, the server 21, upon matching the certificates 140, 140', would accept the session key provided by the client 17. Alternatively, the server 21, upon determining a mismatch of the certificates 140, 140', would deny the session key provided by the client 17 and thus refuse to establish the secure connection 11a.

For example, a portion of the contents 139 can be defined as the whole contents 139, such that the byte by byte comparison is of the whole contents 139 of the certificate 140' with the whole contents 139 of the certificate 140.

Alternatively, the portion of the contents 139 of the certificates 140'140 can be just the public key PBKa in each of the certificates 140,140'. In this case, the byte by byte comparison is of the public key PBKa content of the certificate 140' with the public key PBKa content of the certificate 140. Alternatively, the comparison of the public key PBKa in each of the certificates 140,140' can be using each of the keys (i.e. PBKa in certificate 140 and PBKa in certificate 140') to decrypt the signature SIG in one of the certificates 140, 140', such that the result of the decryption for the signature using PBKa in certificate 140 should be the same as using the PBKa in certificate 140' to decrypt the signature SIG. In this case, the comparison of the certificates 140,140' is making sure that using the public key PBKa content of the certificate 140' and using the public key PBKa content of the certificate 140 provide the same results (e.g. they both decrypt the signature SIG in one of the certificates 140, 140' successfully).

At step 412, the client 17 now has access to the server's 21 public key (via the certificate 141). The client 17 can use the server's 21 public key to verify the server's 21 certificate 141. In addition to verifying the validity dates and (e.g. CA) signature in the site certificate 141, the client 17 can also perform an identity check by comparing the URL that submitted the certificate 141 to the URL specified in ID information contained in the certificate 141. If these match, the client 21 can trust the site certificate 141 and thus the client 17 thereby authenticates the server 21. As discussed, the certificate 141 of the server 21 can be a CA certificate or can be a self-signed certificate 141, as desired. The contents of the certificate 141 of the server could be similar to the contents 39 of the certificate 140 shown in FIG. 3, for example. However, it is recognised that typically the certificate 141 would be issued by a CA and thus the subject name 146 of the certificate 141 would be that of the identify of the CA itself.

At step 414, once this mutual authentication process is complete (e.g. the server 21 and client 17 could exchange certificate authentication messages upon successful authentication of the certificates 140, 141), the client 17 will create a symmetric encryption key (e.g. the session key of the secure connection 11*a*) by using the client's 17 private key PVKa to encrypt the symmetric encryption key. At step 416, the client 17 then sends the session key to the server 21, which is accepted if the certificates 140,141 matched (i.e. the comparison of the content(s) 139 of the certificates 140,140' with one another matched). In terms of public/private key encryption, only the authenticated server 21 that possesses the matching public key PBKa (as obtained via the authenticated certificate 140) will be able to decrypt the encryption/session key (i.e. session-specific shared key with which further communication is encrypted using a symmetric cipher) sent by the client 17. Alternatively the session key can be generated by the client 17 encrypting a random number with the server's 21 public key and sending the result to the server 21 (which only the server 21 should be able to decrypt with its private key); both parties 17, 21 then use the random number to generate the unique session key for subsequent encryption and decryption of data 122, 124 during the session on the secure connection 11*a*. For example, it is recognised that the session key (e.g. symmetric key or at least the random number/shared value upon which the session key is based) issuer uses their private key to sign the session key. For example, the shared value issued by the client 17 is used to generate/negotiate the session key (representing a preshared key for the session on the secure connection 11*a*). For example, the shared value issued by the server 21 is used to generate/negotiate the session key (representing a preshared key for the session on the secure connection 11*a*).

Now that the server and the client 17 have exchanged the symmetric encryption key, or at least the random/shared number generated/exchanged, they will use the corresponding encryption/symmetric key to encrypt subsequent communications 122, 124 at step 418, as further described below by example.

Further to the above, it is also recognised that additional steps can be performed by the server 21. For example, the step of storing the copy 140' of the digital certificate in a cache (e.g. storage 122—see FIG. 5) for use in subsequent authentication of a further communicated self-signed certificate 140 received from the EPP client 17. For example, the steps of obtaining an updated unique identifier of the EPP client 17, accessing the designated DNS record 144 in the DNS 130 associated with the updated unique identifier, retrieving an updated copy 140' of the digital certificate from the designated DNS record 144, the updated copy 140' of the digital certificate containing a further public key PKBa bound to the domain name 14', and utilizing the further public key PKBa with an updated session key of a further secure connection 11*a* over the communications network 11 with the EPP client 17. For example, the steps of determining the further communicated self-signed certificate 140 is invalid, accessing the designated DNS record 144 in the DNS 130 associated with the domain name 14', and retrieving an updated digital certificate 140' from the designated DNS record 144, the updated digital certificate 140' containing the further public key PKBa. Further, the further public key can be utilized with an updated session key (as received from the client 17) of a further secure connection 11*a* over the communications network 11 with the EPP client 17. Further, the server 21 can store the further communicated digital certificate 140 in a local storage 122 and retrieve the further communicated digital certificate 140 from the storage 122, in order to validate and authenticate subsequent connection requests 123 (and correspondingly received certificates 140) from the client 17. For example, the communicated digital certificate(s) 140 can be deemed invalid based on the digital certificate 140 being expired.

Further to the above, it is also recognised that the client 17 can cause the certificate 140,140' to be generated and thus stored in advance of seeking the secure connection 11*a* with the server 21. For example, a method can be performed by the registrar 16 (in cooperation with the client 17) for utilizing a digital certificate in establishing a secure connection 11*a* between the client 17 and the server 21 on a communications network 11, the digital certificate being a self-signed certificate 140,140'. The method can include the steps of: generating the self-signed certificate 140 for use by the EPP client 17; obtaining a unique identifier associated with the EPP client 17, the unique identifier associated with a domain name 14' stored in the DNS 130; selecting a designated DNS record 144 in a DNS zone of the DNS 130 associated with unique identifier; requesting storage of a copy of the self-signed certificate 140' in the designated DNS record 144, the copy of the self-signed certificate 140' containing a public key PBKa of the EPP client 17 bound/associated to the domain name 14'; sending the self-signed certificate 140 to the server 21 for use in authentication by the server 21 of the self-signed certificate 140 by comparison of at least a portion of the copy of the self-signed certificate 140' with a corresponding portion of the self-signed certificate 140; and upon authentication of the self-signed certificate 140, negotiating a generated session key between the EPP client 17 and the server 21 to establish the secure connection 11*a* over the communications network 11; wherein an issuer (e.g. registrar 16) of the self-signed certificate 140 operates the EPP client 17.

Domain Name Transactions 142

As further described below, the domain name management system 10 facilitates management of a plurality of the domain names 14 via a set of objects 15 associated explicitly with each of the domain names 14. Referring again to FIG. 1, the registry operator 20 can also interact with the registry services provider 23 responsible for services/capabilities facilitating smooth and efficient operation of any type of domain registry database 18. For example, the registry services provider 23 can provide to the registry operator 20*a* standards-based, EPP registry system facilitating a reliable, secure platform for domain operations. Further, the registry services provider 23 can provide a distributed DNS 130 system facilitating domain availability on the Internet 11 coupled with provision of state-of-the-art security against attack and abuse. Further, the registry services provider 23 can provide launch or improvement assistance for the domains identified by the domain names 14 of the registrar 16. Further, the registry services provider 23 can provide registry solutions and accommodate policy needs for the domain. It is also recognized that the registry services provider 23 can implement all or a subset of the registry functionality and support services on behalf of the registry operator 20 (for example the registry services provider 23 can be the registry operator 20 for a selected domain names 14 of the registrar 16).

Registration and maintenance of domain names 14 involve management of objects 15 associated with each of the domain names 14. These objects 15 are populated with appropriate data based on action(s) (e.g. EPP transactions 142) performed on the objects 15 (e.g. update/modification, delete/del, transfer, renew, etc.). Example actions on the objects 15 requested by the EPP message 122 are such as registration/purchase of the domain names 14 by the registrant 12 from the registrar 16. Other example actions on the objects 15 can include management by the Registry Operator 20 of up-to-date data in the objects 15 concerning domain name and name server registrations maintained by the Registry Operator 20, useful in verifying and providing operational stability of Registry Services and the DNS.

Example Objects 15

The specification of the content and format of this data of the objects 15 can be such as but not limited to:
1. Registrar objects. The registrar object corresponds to a single registrar. It includes the following data:
Registrar ID (conforming to the IANA registrar-ids registry)
Contact ID of Registrar
Registrar Administrative Contacts
Registrar Technical Contacts
Registrar Billing Contacts
Registrar URL
Registrar Creation Date
Registrar Last Updated Date
2. Contact objects. The contact object corresponds to a single contact (whether registrant, administrative, technical or billing contact). The contact object includes the following data:
Contact ID
Contact Name
Contact Organization
Contact Address, City, State/Province, Country
Contact Postal Code
Contact Phone, Fax, E-mail
3. Nameserver objects. A nameserver object corresponds to a single registered nameserver. The nameserver object includes the following data:
Name Server ID
Name Server Host Name
Name Server IP Addresses if applicable
Current Registrar
Name Server Creation Date
Name Server Last Updated Date
4. Domain objects. The domain object corresponds to a single Registered Name. Each domain object includes the following data:
Domain ID
Domain Name
Sponsoring Registrar
Domain Status
All contact information (including all details) with at least one each of:
 Registrant
 Administrative
 Technical
 Billing
All nameservers associated with this domain
Domain Registration Date
Domain Expiration Date
Domain Last Updated Date It is recognized that registrant 12 itself can communicate directly with the registrar 16, the Registry Operator 20 and/or the registry services provider 23 for registration and/or maintenance information used in registration and maintaining of the domain names 14 via coordinating the data content of the objects 15, and/or can communicate registration and/or maintenance information indirectly with registry services provider 23 via registry operator 20. Further, registry operator 20 can supply any requested registration and/or maintenance information to registry services provider 23 on behalf of registrant 12. As such, the registration and/or maintenance information is considered data used to populate the objects 15 based on actions 142 (e.g. update, delete, transfer, renew, etc.) performed on the objects 15, as facilitated by the secure connection 11*a* for the communication of EPP requests 122 and corresponding responses 124 associated with the transactions 142.

Example Actions 142

An action 142 is defined as an operation on an object 15 unique to each of the plurality of domain names 14, realizing that each of the plurality of the domain names 14. An example action 142 can be assigning the domain names 14 to a new domain name registrant 12. Alternative actions 142 can include actions such as but not limited to check, info/status, update/mod, delete/del, transfer, and/or renew.

The action 142 can be based on a protocol such as Extensible Provisioning Protocol (EPP) or Registry Registrar Protocol (RRP). The Extensible Provisioning Protocol (EPP) is a flexible protocol designed for allocating objects 15 within registries over the Internet 11 (using the secure connection 11*a*). EPP provides a robust and flexible protocol that facilitates transaction communications between domain name registry service providers 23 and domain name registrars 16. These transactions are used whenever a domain name 14 is acted upon using actions 142 such as to effect data content of the domain name objects 15 to reflect registered, transferred, renewed or otherwise amended domain names 14. As such, the EPP protocol is used to implement an order (request action 142 on an object via the communication 122) and fulfilment (perform and report result of object when acted upon) system. Specified in XML, EPP provides four basic service elements: a greeting, commands/requests 122 (e.g. containing actions 142), responses 124 (e.g. to the actions effecting changes to data content of the objects 15 associated with the actions), and an extension framework that supports future definition of managed objects 15 and the relationship of EPP protocol requests (e.g. actions) and responses to those objects 15. It is recognised that actions of EPP are expressed as XML, a structured, text-based format, such that communication over the network 11 of the actions between network entities 16, 18, 20, 23, 23' can be specified over the secure connection 11*a* (e.g. TCP communication messaging and/or other transport communication messaging such as BEEP, SMTP, or SOAP).

It is recognised that the entities 16,18,20,23,23' can interact on the network 11 with one another in client server pairs. For example, the registrar 16 can be the EPP client 17 and the registry database 18 (with associated registry operator 20) can be the paired EPP server 21. In general, an EPP server 21 responds to a successful connection by returning a greeting to the client 17. The client 17 waits for the greeting and establishment of the secure connection 11*a* before sending an EPP command 122 (i.e. containing action 142) to the server 21. EPP commands 122 and responses 124 are exchanged serially between the client 17 and the server 21 over the secure network connection 11a, in order to affect the data contents of the corresponding objects 15 that are acted upon by the action 142 implemented by the server 21 (i.e. as requested by the client 17). The server 21 responds 124 to each EPP command 122 with a coordinated response 124 that describes the results of processing the command 122.

EPP commands 122 can fall into three categories: session management commands, query commands, and data transform commands. Session management commands are used to establish and end sessions with an EPP server. Query commands are used to perform read-only, object-based information retrieval operations with respect to data contents of the objects 15. Transform commands are used to perform read-write object management operations with respect to the data contents of the objects 15. EPP provides commands to manage sessions, retrieve object information, and perform transformation operations on objects. All EPP commands are atomic and idempotent, either succeeding completely or failing completely and producing predictable results in case of repeated execution. EPP provides three commands/actions to retrieve object information: action <info> to retrieve detailed information associated with a known object, action <ping> to determine if an object is known to the server, and action <transfer> to retrieve known object transfer status information. EPP provides five commands/actions to transform (i.e. modify the data contents of the object 15) objects 15: action <create> to create an instance of an object 15 with a server, action <delete> to remove an instance of an object 15 from a server, action <renew> to extend the validity period of an object 15, action <update> to change information associated with an object 15, and action <transfer> to manage changes in client sponsorship (e.g. change in registrant 12) of a known object 15. As such, instance of an object 15 refers to the specific data contents of an object 15. EPP uses four decimal digits to describe the success or failure of each EPP command. The four digits of the reply each have special significance. The first digit denotes whether the response submitted by the server back to the client marks command success or failure. A client that wants to know approximately what kind of error occurred (command syntax error, security error, system error, etc.) can examine the second digit. The third and fourth digits are used to provide explicit information detail by the server to the client with respect to the results of command execution and object 15 data contents change thereby.

In view of the above descriptions of storage 18 for the computer devices 100 (see FIG. 5) of registry operator 20 and service 23, storage 18 can be configured as keeping the stored data (e.g. objects 15) in order and the principal (or only) operations on the stored data are the addition/amendment of or removal of the stored data from storage 18 (e.g. FIFO, FIAO, etc.). For example, storage 18 can be a linear data structure for containing and subsequent accessing of the stored data and/or can be a non-linear data structure for containing and subsequent accessing of the stored data.

Further, storage 18 receives various entities such as data that are stored and held to be processed later. In these contexts, storage 18 can perform the function of a buffer, which is a region of memory used to temporarily hold data while it is being moved from one place to another (i.e. between the between computer devices 100). Typically, the data is stored in the memory when moving the data between processes within/between one or more computers. It is recognised that storage 18 can be implemented in hardware, software, or a combination thereof. The storage 18 is used in the network system 10 when there is a difference between the rate/time at which data is received and the rate/time at which the data can be processed (e.g. ultimately by the devices 100).

Further, it will be understood by a person skilled in the art that memory/storage 18 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory or other in-computer storage. Second, in a more formal usage, memory/storage 18 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 18 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 18 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server (acting as a client 17 or as a server 21 of a classic client-server relationship), it is recognised that the computer devices 100 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 11. The computer devices 100 implementing functionality of registry operator 20 and service 23 can provide specialized services across the network 11, for example to private users inside a large organization or to public users via the Internet 11. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 11 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Figure 5:
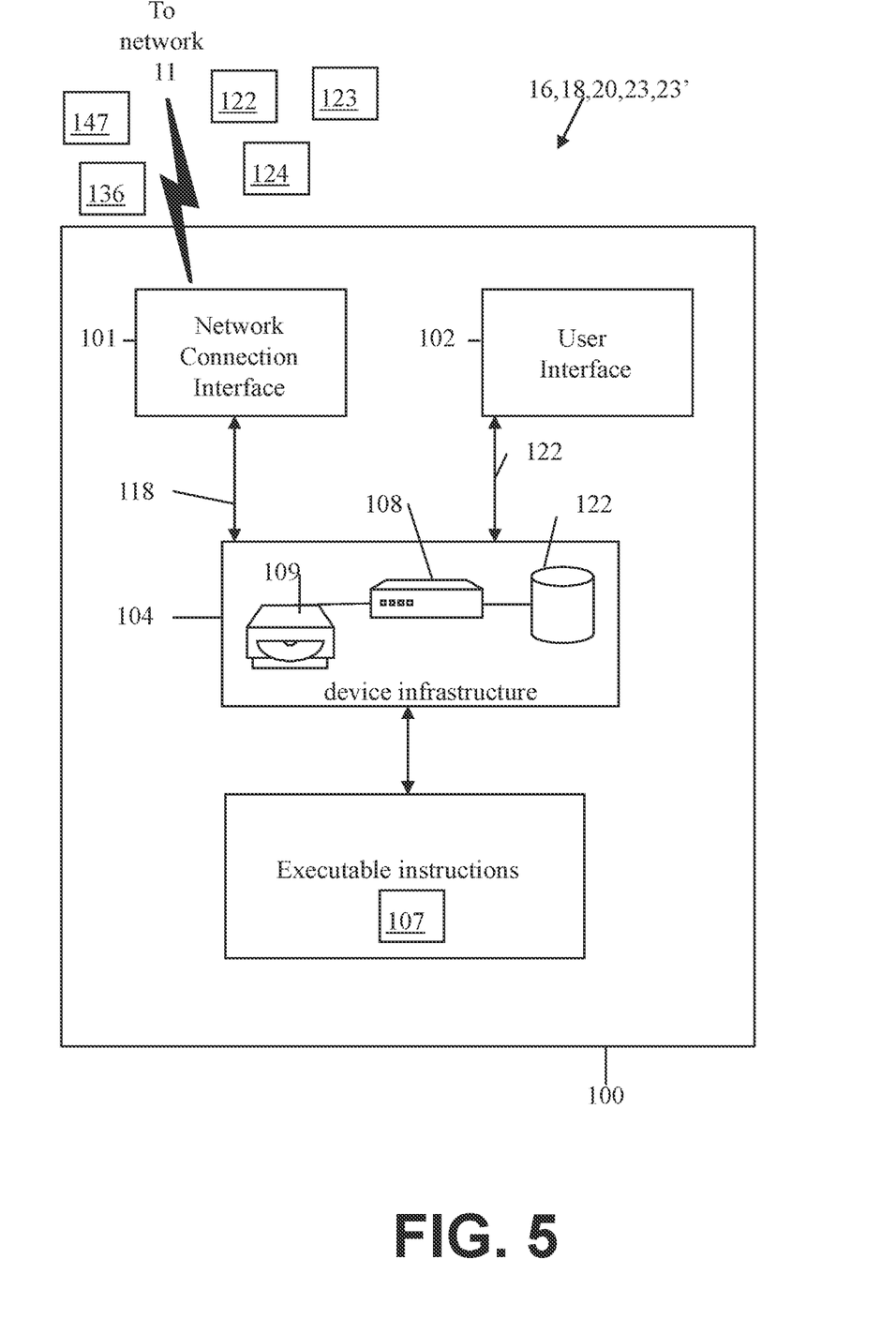
FIG. 5 is an example configuration of a computer device hosting any of the network entities utilized in FIG. 1.

Referring to FIG. 5, a computing device 100 implementing functionality of a registrar 16, a registry operator 20 and/or a service 23,23' can include a network connection interface 101, such as a network interface card or a modem, coupled via connection 118 to a device infrastructure 104. The connection interface 101 is connectable during operation of the devices to the network 11 (e.g. an intranet and/or an extranet such as the Internet), which enables the devices to communicate with each other as appropriate. The network 11 can support the communication of the communications 122,123,124,147,136,142, and the related content.

Referring again to FIG. 5, the device 100 can also have a user interface 102, coupled to the device infrastructure 104, to interact with a user (e.g. server administrator—not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 5, operation of the device 100 is facilitated by the device infrastructure 104. The device infrastructure 104 includes one or more computer processors 108 and can include an associated memory 122 (e.g. memory 18). The computer processor 108 facilitates performance of the device 100 configured for the intended task (e.g. of the respective module(s) of the registrar 16, service 23, operator 20) through operation of the network interface 101, the user interface 102 and other application programs/hardware of the device 100 by executing task related instructions. These task related instructions can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium 109 coupled to the processor 108 for providing instructions to the processor 108 and/or to load/update the instructions 107 implemented by the processor 108 in performing the steps/operations of the registrar 16, service 23, operator 20 (e.g. the described client 17, server 21 functions). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine-readable instructions for implementing predetermined functions/operations including those of an operating system and the modules, for example. The processor 108 as used herein is a configured device and/or set of machine-readable instructions for performing operations as described by example above, including those operations as performed. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the registrar 16, the service 23 and/or operator 20 can include one or more of the computing devices 100 (comprising hardware and/or software) for implementing the modules, as desired.

It will be understood in view of the above that the computing devices 100 may be, although depicted as a single computer system, may be implemented as a network of computer processors, as desired.

What is claimed is:

1. A method for using a digital certificate for establishing a secure connection between an Extensible Provisioning Protocol (EPP) client and a server on a communications network, the digital certificate being a self-signed certificate, which method comprises:

receiving a communicated self-signed certificate from the EPP client;

obtaining a unique identifier of the EPP client, the unique identifier associated with a domain name stored in a Domain Name System (DNS);

using the unique identifier to access a designated DNS record in a DNS zone of the DNS associated with the domain name;

retrieving the copy of the digital certificate from the designated DNS record, the copy of the digital certificate containing a public key of the EPP client bound to the domain name;

authenticating at least a portion of the copy of the digital certificate with a corresponding portion of the communicated self-signed certificate by comparison; and receiving a generated session key from the EPP client to establish the secure connection over the communications network with the EPP client.

2. The method of claim 1, wherein the designated DNS record is a DNS-Based Authentication of Named Entities (DANE) record such as a Transport Layer Security Authentication (TLSA) record.

3. The method of claim 2, wherein the alias is provided during a registration process of a registrar with a registry of the domain name, the registration process for authenticating the registrar with the registry, the EPP client associated with the registrar.

4. The method of claim 3, wherein unique identifier is received as a business name of a registrar associated with the EPP client.

5. The method of claim 1, wherein the designated DNS record is a CERT resource record used for storage of certificates in the DNS.

6. The method of claim 1, wherein the digital certificate authenticates implementation of the secure connection utilizing a cryptographic protocol, the cryptographic protocol providing communications security between the EPP client and the server via the secure connection.

7. The method of claim 6, wherein the cryptographic protocol is TLS.

8. The method of claim 1, wherein the unique identifier is a name of the domain name of the EPP client.

9. The method of claim 1, wherein the unique identifier is an alias of the domain name of the EPP client provided as a network address on the communications network of the domain name.

10. The method of claim 9, wherein the network address is an Internet Protocol (IP) address.

11. The method of claim 10 further comprising using a reverse lookup on the IP address to determine the domain name.

12. The method of claim 1, wherein the unique identifier is retrieved from an EPP client unique identifier list using an alias mapped to the unique identifier in the EPP client unique identifier list, the alias received prior to said obtaining.

13. The method of claim 1, wherein the unique identifier is provided during a registration process of a registrar with a registry of the domain name, the registration process for authenticating the registrar with the registry, the EPP client associated with the registrar.

14. The method of claim 1, wherein the unique identifier is an IP address of the EPP client.

15. The method of claim 1, wherein a registrar of the domain name stores the digital certificate in the designated DNS record prior to said receiving the communicated self-signed certificate, the registrar associated with the EPP client.

16. The method of claim 1, which further comprises storing the copy of the digital certificate in a cache for use in subsequent authentication of a further communicated self-signed certificate received from the EPP client.

17. The method of claim 16, which further comprises:
determining the further communicated self-signed certificate is invalid;
accessing the designated DNS record in the DNS associated with the domain name; and
retrieving an updated digital certificate from the designated DNS record, the updated digital certificate containing the further public key.

18. The method of claim 17, which further comprises utilizing the further public key with an updated session key of a further secure connection over the communications network with the EPP client.

19. The method of claim 17, which further comprises storing the further communicated digital certificate in a local storage and retrieving the further communicated digital certificate from said storage.

20. The method of claim 17, wherein the further communicated digital certificate is deemed invalid based on the digital certificate is expired.

21. The method of claim 1, which further comprises:
obtaining an updated unique identifier of the EPP client;
accessing the designated DNS record in the DNS associated with the updated unique identifier;
retrieving an updated copy of the digital certificate from the designated DNS record, the updated copy of the digital certificate containing a further public key bound to the domain name; and
utilizing the further public key with an updated session key of a further secure connection over the communications network with the EPP client.

22. The method of claim 1, wherein the domain name is a subject name of the copy of the certificate contained in the designated DNS record.

23. The method of claim 1, wherein the unique identifier is a subject name of the copy of the certificate contained in the designated DNS record.

24. The method of claim 1, wherein said at least the portion of the copy of the digital certificate is a first whole contents of the copy of the digital certificate and said corresponding portion of the communicated self-signed certificate is a second whole contents of the communicated digital certificate.

25. The method of claim 24, wherein said comparison is by performing a byte by byte comparison of the first whole contents with the second whole contents.

26. The method of claim 24, wherein said comparison is by comparing a first decryption result using the public key obtained from the first whole contents with a second decryption result using a further public key obtained from the second whole contents.

27. A method for utilizing a digital certificate in establishing a secure connection between an Extensible Provisioning Protocol (EPP) client and a server on a communications network, the digital certificate being a self-signed certificate, which method comprises:
generating the self-signed certificate for use by the EPP client;
obtaining a unique identifier associated with the EPP client, the unique identifier associated with a domain name stored in a Domain Name System (DNS);
selecting a designated DNS record in a DNS zone of the DNS associated with unique identifier;
requesting storage of a copy of the self-signed certificate in the designated DNS record, the copy of the self-signed certificate containing a public key of the EPP client bound to the domain name;
sending the self-signed certificate to the server for use in authentication by the server of the self-signed certificate by comparison of at least a portion of the copy of the self-signed certificate with a corresponding portion of the self-signed certificate; and
upon authentication of the self-signed certificate, negotiating a generated session key between the EPP client and the server to establish the secure connection over the communications network wherein an issuer of the self-signed certificate operates the EPP client.

\* \* \* \* \*